US012791084B2

(12) United States Patent
Mooney

(10) Patent No.: US 12,791,084 B2
(45) Date of Patent: Nov. 10, 2026

(54) GEARED SYSTEM FOR A RESISTANCE TRAINING MACHINE, SYSTEMS, AND METHODS OF USE

(71) Applicant: Speede Fitness, LLC, Lake Zurich, IL (US)

(72) Inventor: Daniel Mooney, Lake Zurich, IL (US)

(73) Assignee: Speede Fitness, LLC, Lake Zurich, IL (US)

( * ) Notice: Subject to any disclaimer, the term of this patent is extended or adjusted under 35 U.S.C. 154(b) by 70 days.

(21) Appl. No.: 18/912,013

(22) Filed: Oct. 10, 2024

(65) Prior Publication Data

US 2025/0122921 A1 Apr. 17, 2025

Related U.S. Application Data

(60) Provisional application No. 63/589,441, filed on Oct. 11, 2023.

(51) Int. Cl.
*F16H 3/22* (2006.01)
*A63B 21/00* (2006.01)
*A63B 21/005* (2006.01)
*F16H 3/04* (2006.01)

(52) U.S. Cl.
CPC ......... *F16H 3/22* (2013.01); *A63B 21/00069* (2013.01); *A63B 21/0058* (2013.01); *F16H 3/04* (2013.01)

(58) Field of Classification Search
CPC ... F16H 3/22; F16H 3/04; F16H 61/04; F16H 2003/0811; F16H 2061/047; F16H 2063/3093; F16H 3/089; A63B 21/00069; A63B 21/0058; A63B 21/15
See application file for complete search history.

(56) References Cited

U.S. PATENT DOCUMENTS

| | | | | |
|---|---|---|---|---|
| 4,678,184 | A * | 7/1987 | Neiger ................. | A63B 21/153 482/4 |
| 6,652,429 | B2 | 11/2003 | Bushnell | |
| 8,105,206 | B2 | 1/2012 | Rindfleisch | |
| 8,388,499 | B1 | 3/2013 | Rindfleisch | |
| 9,694,229 | B2 | 7/2017 | Taft | |
| 10,190,682 | B2 | 1/2019 | Paisley et al. | |
| 10,335,626 | B2 | 7/2019 | Orady et al. | |
| 10,603,535 | B2 | 3/2020 | Alexander et al. | |
| 10,617,903 | B2 * | 4/2020 | Orady .................... | A63B 23/12 |
| 10,709,932 | B2 | 7/2020 | Herring | |
| 10,881,890 | B2 | 1/2021 | Orady et al. | |
| 11,077,330 | B2 | 8/2021 | Orady et al. | |

(Continued)

FOREIGN PATENT DOCUMENTS

| | | | |
|---|---|---|---|
| WO | 2023/069724 | A1 | 4/2023 |
| WO | 2023/102016 | A1 | 6/2023 |
| WO | 2023/250464 | A2 | 12/2023 |

OTHER PUBLICATIONS

US 10,279,209 B2, 05/2019, Orady et al. (withdrawn)

*Primary Examiner* — Andrew M Kobylarz

(74) *Attorney, Agent, or Firm* — J. Peter Paredes; Amin Wasserman Gurnani LLP

(57) ABSTRACT

Provided herein are Geared Systems for a Resistance Training Machines, Systems, and Methods of Use. The geared system operates with an actuator operably coupled to a motor system, wherein the motor system is operatable to provide resistance in a resistance training machine.

11 Claims, 5 Drawing Sheets

(56) References Cited

U.S. PATENT DOCUMENTS

| | | | | |
|---|---|---|---|---|
| 11,351,409 | B2 | 6/2022 | Alexander et al. | |
| 11,452,908 | B1 | 9/2022 | Eilers et al. | |
| 11,572,947 | B2 | 2/2023 | Enot et al. | |
| 12,048,859 | B1 * | 7/2024 | He | A63B 21/0058 |
| 2007/0155587 | A1 | 7/2007 | Huang et al. | |
| 2012/0065034 | A1 | 3/2012 | Loach | |
| 2014/0315689 | A1 | 10/2014 | Vauquelin et al. | |
| 2014/0336015 | A1 | 11/2014 | Forsyth | |
| 2018/0326241 | A1 | 11/2018 | Huskins et al. | |
| 2021/0195842 | A1 | 7/2021 | Williams | |
| 2022/0062691 | A1 * | 3/2022 | Kao | A63B 21/157 |
| 2022/0118304 | A1 * | 4/2022 | McNally | A63B 21/159 |
| 2022/0258006 | A1 | 8/2022 | Norris | |
| 2022/0410361 | A1 | 12/2022 | Hallberg et al. | |
| 2023/0001259 | A1 | 1/2023 | Simenthi | |
| 2023/0009699 | A1 | 1/2023 | Ferlito et al. | |
| 2025/0352840 | A1 * | 11/2025 | Mooney | A63B 21/002 |

* cited by examiner

GEARED SYSTEM FOR A RESISTANCE TRAINING MACHINE, SYSTEMS, AND METHODS OF USE

CROSS-REFERENCE TO RELATED APPLICATIONS

The application claims priority to U.S. provisional application Ser. No. 63/589,441, filed Oct. 11, 2023, herein incorporated by reference in its entirety.

BACKGROUND

The invention generally relates to geared systems for a resistance training machine.

Resistance training is a form of exercise undergone to build muscular strength and endurance by working against a weight or applied force. While some resistance training routines can be accomplished without external equipment, i.e., bodyweight exercises, many others require the use of specialized equipment, such as but not limited to free weights, weight machines, cable machines, resistance bands, and the like.

Traditional resistance training equipment is often specialized and, while each piece of equipment may offer distinct advantages, each may also suffer from drawbacks and inefficiencies. For example, free weights and weight machines are commonly employed for isotonic exercises, i.e., exercises requiring muscle activation against a constant force across a given range of motion. However, adjusting the weight or force for such exercises can be inconvenient, often requiring a user to add or remove plates, install clips, swap out dumbbells, etc. Furthermore, initiating an exercise with free weights and weight machines can create undue strain on a user's body, since the force applied by such equipment acts as a step function-jumping from zero to the full resistance. Perhaps more importantly, traditional resistance training equipment is usually designed for specific exercises or specific exercise modes only, requiring an individual to own a plurality of equipment in order to access a variety of well-rounded exercises.

More recently, 'smart' exercise machines have been developed that claim to offer a number of different exercises in a single machine. These machines commonly operate by providing resistive forces through electronic motors, which may be adjusted to the user's strength level. However, the exercise machines disclosed by the prior art have consistently failed to provide a range of exercise modes or can provide some modes but fail in others. Moreover, such machines tend to be limited in the amount of force they produce; they are usually unwieldy and difficult to install or transport; and many fail to provide adequate safety measures for the user. Finally, neither traditional resistance training equipment nor newer exercise machines offer feedback regarding both user form and user balance during workouts.

In the perfect world, the gear shifts during workouts have perfect mechanical, angular alignment of the splines and shifts every time. In practice, this is not the case as the center spline male can get stuck on the female alignment spline. Accordingly, there remains a need in the art for a geared system to control shifting of gears in a resistance training machine.

SUMMARY OF THE INVENTION

Provided herein are Geared Systems for a Resistance Training Machines, Systems, and Methods of Use.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53 (c) EPC and Rule 28 (b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
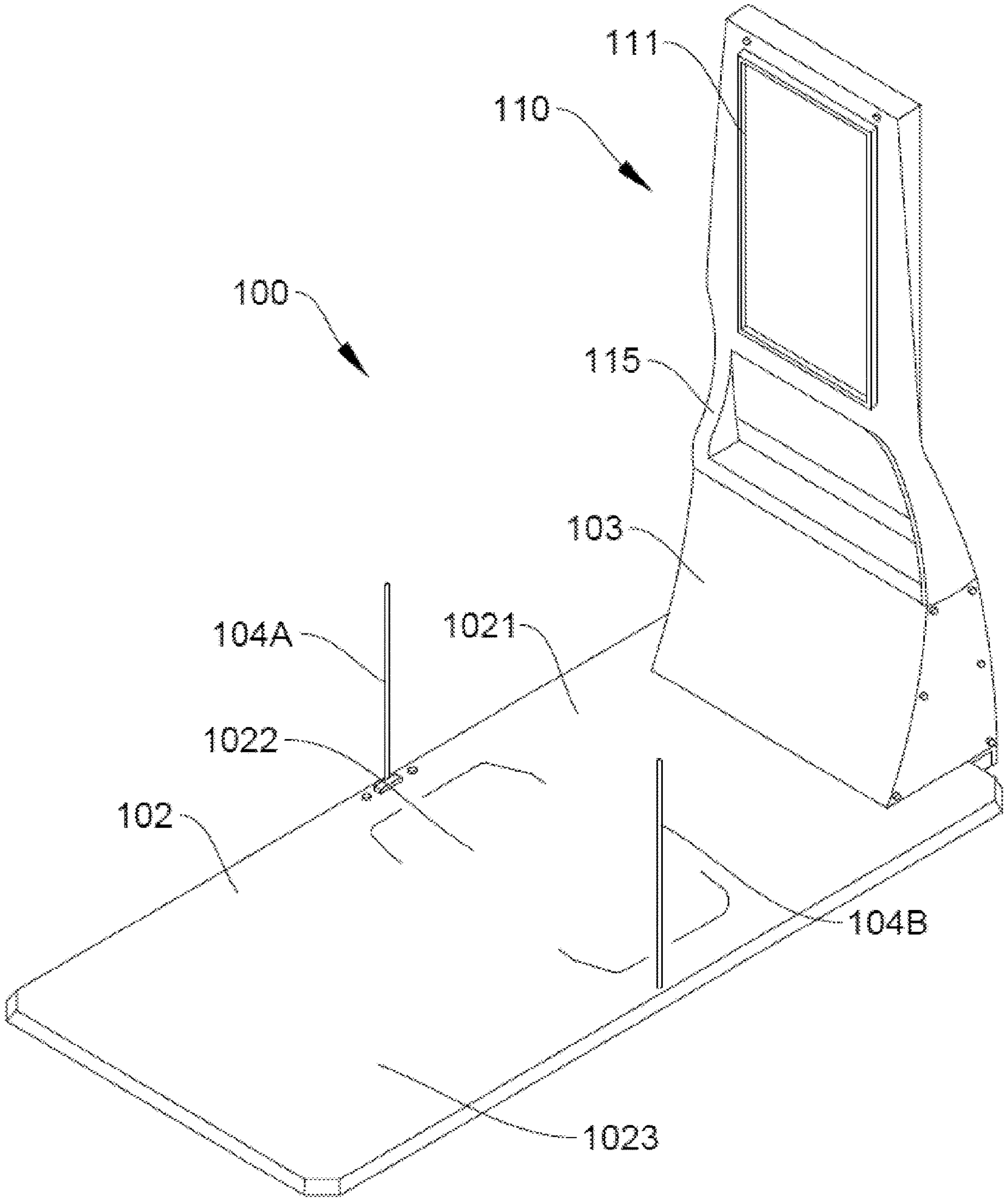
FIG. 1 is a perspective view of the multi-motor resistance training machine, according to one embodiment.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes, or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g.," or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the mechanical, software, and electrical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DESCRIPTION OF EMBODIMENTS

Figure 2A:
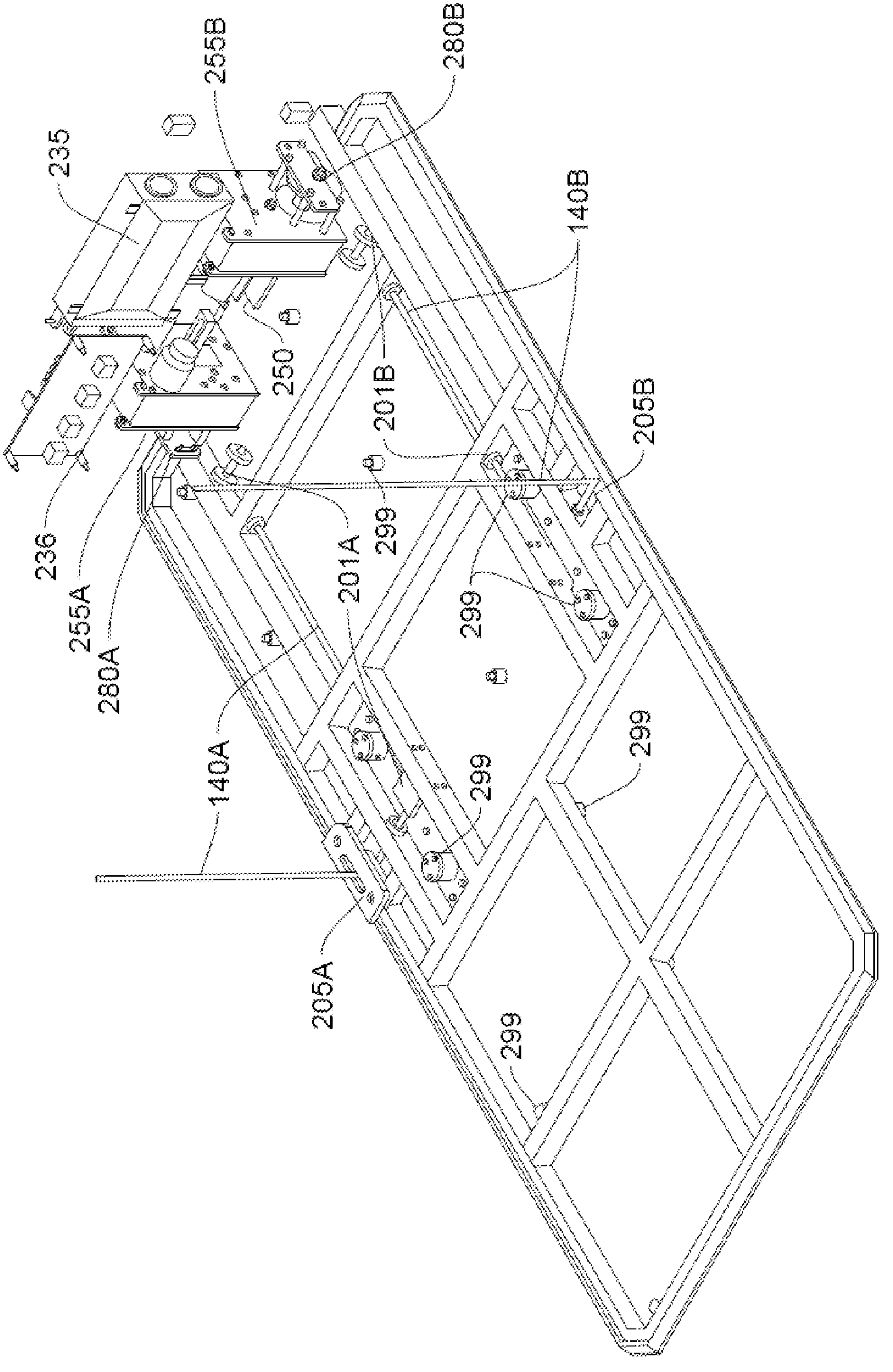
FIG. 2 is a cut-away perspective view of the multi-motor resistance training machine, according to one embodiment.

Referring now to the drawings and with specific reference to FIG. 1, a diagram of a multi-motor resistance training machine is generally referred to by a reference numeral 100 and may be generally referred to as machine or resistance training machine. The multi-motor resistance training machine 100 may be situated in a home, apartment, hotel, commercial gym, and the like, and may be capable of enabling both isotonic exercises and isokinetic exercises at varying force and velocity levels, respectively, for a user. Furthermore, the resistance training machine may measure and communicate form feedback, force feedback, velocity feedback, position feedback, calibration feedback, and balance feedback during some or all exercises performed on the machine 100, thereby improving workout efficacy and safety for the user. As seen in FIGS. 1-2, the multi-motor machine 100 may comprise at least a platform 102, a left cable 140A, a right cable 140B, and a human-machine interface (HMI) 110 to select one or more exercise modes. The resistance training machine 100 may comprise the platform 102 for a user to stand on and engage in exercises, wherein the platform may include a front section 1021, a middle section 1022, and a rear section 1023. An electromagnetic assembly (EM) 103 may be attached to the front section 1021, and a front upright stand 115 may be attached to and extend vertically from the EM assembly 103 to display the HMI 110. The EM assembly 103 operates with multi-motors to provide resistance training for isotonic exercises and isokinetic exercises in a plurality of modes. The multi-motors work together to provide left and right movements on the resistance training machine, where the multi-motors work in parallel with a speed gear box to employ a low force and a high-speed work out and a slower speed but a high force work out.

Geared System

The resistance training machine provides high torque, constant velocity, variable force in the Isokinetic mode and constant force, variable speed, lower torque in the Isotonic Mode. In order to switch between modes, the modes require that there are at least two gear trains for each unique mode. This resistance training machine includes an electronic actuator where a center gear moves to engage one mode or the other mode. If the shift has perfect mechanical, angular alignment of the splines and shifts every time. However, if the center spline male get stuck on the female alignment spline, the geared system makes the proper corrective action to make the second shift work 100% of the time.

Figure 3:
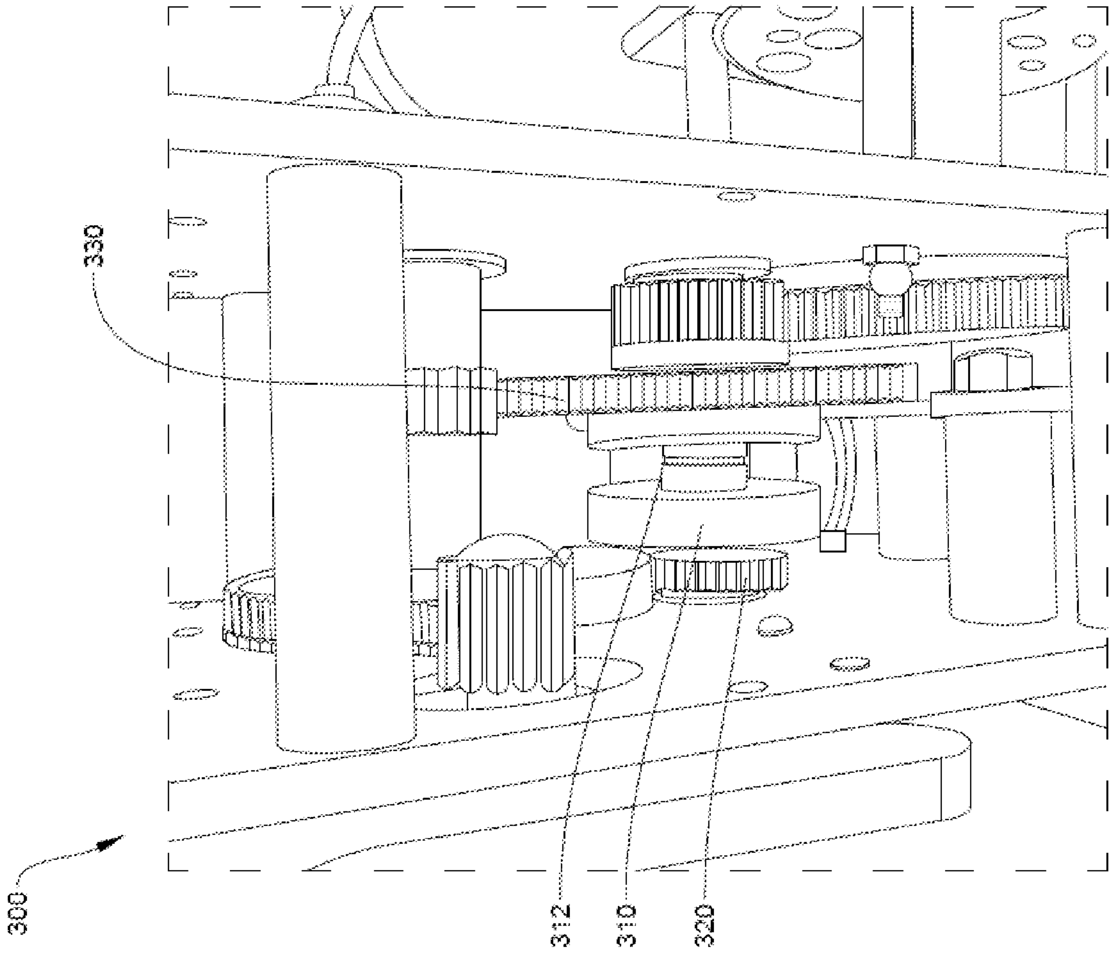
FIG. 3 is a side-view of the geared system, according to one embodiment.

As shown in FIG. 3, the geared system 300 for a resistance training machine, comprises an actuator 310 operably coupled to a motor, wherein the motor is operatable to provide resistance in a resistance training machine; the actuator 310 shifts the motor system from a lower gear 320 to a higher gear 330 in a first actuator position, and the actuator 310 shifts the motor system from the higher gear 330 to the lower gear 320 in a second actuator position. As shown in FIG. 4, the higher gear 330 includes a plurality of female engagement points 332 for the actuator, and the actuator 310 includes a plurality of male engagement points 312 for the higher gear 330, such that the plurality of male engagement points 312 lock into the plurality of female engagement points 332 as to lock the actuator 310 in the first actuator position, and preventing a failed shift of the actuator 310 from the lower gear 320 to the higher gear 330 if the plurality of male engagement points 312 do not lock into the plurality of female engagement points 332, then the actuator 310 rotates at least one degree as to lock the plurality of male engagement points 312 into the plurality of female engagement points 332.

Figure 4B:
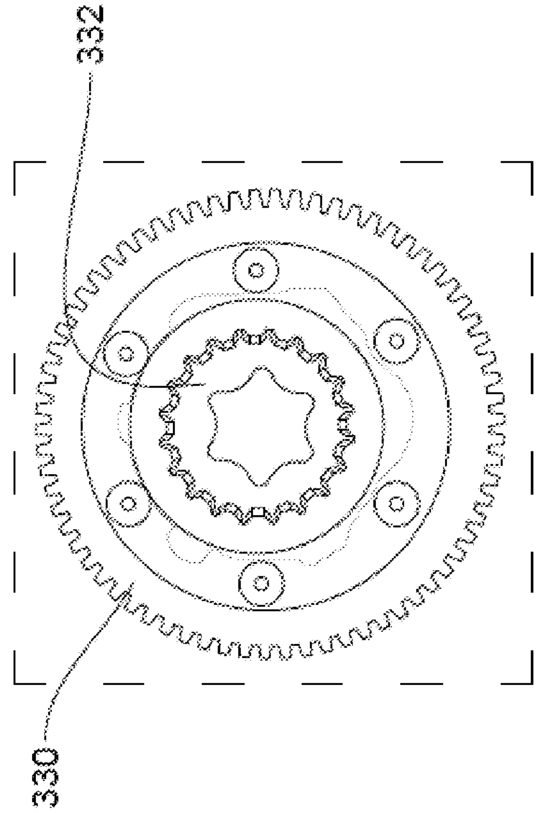
FIG. 4B is a side view of the high gear including the plurality of female engagement points in the circular configuration, according to one embodiment.
Figure 4A:
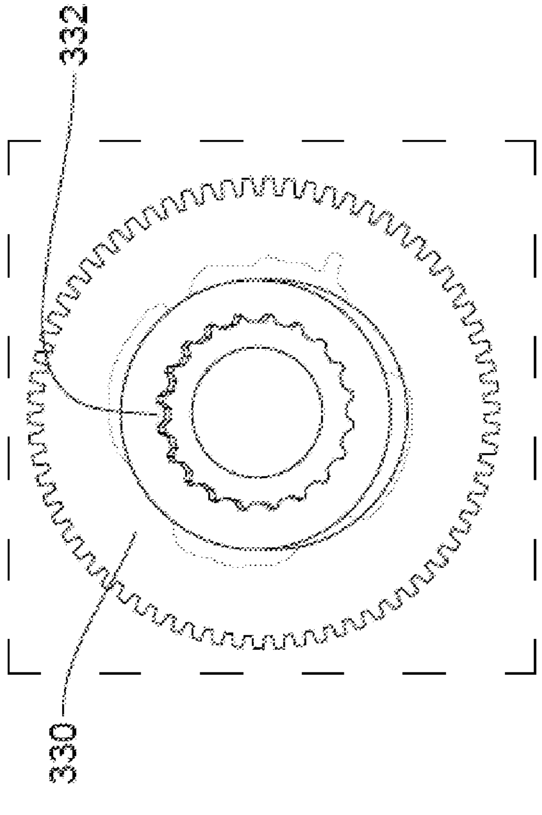
FIG. 4A is a side view of the high gear including the plurality of female engagement points in the triangular configuration, according to one embodiment.
Figure 4C:
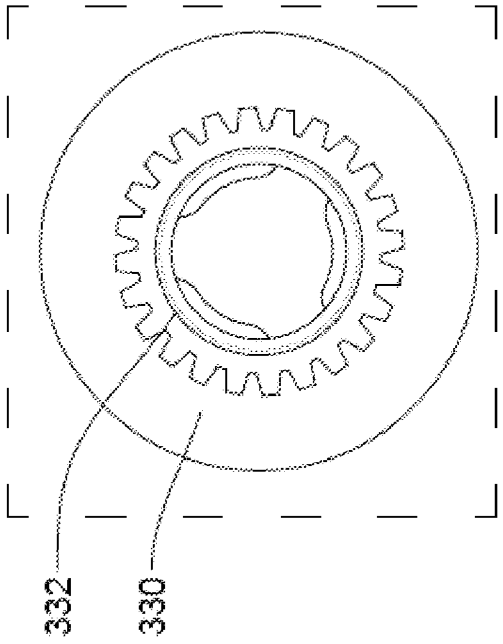
FIG. 4C is a side view of the high gear including the plurality of female engagement points in the circular configuration, according to one embodiment.

As shown in FIGS. 4A-4C, the plurality of female engagement points and the plurality of male engagement points are between about 3 and about 42. The corresponding plurality of male engagement points are equal to the plurality of female engagement points and may be between about 3 and about 42. As shown in FIG. 4C, the plurality of female engagement points and the plurality of male engagement points include a triangular configuration. As shown in FIG. 4B, the plurality of female engagement points and the plurality of male engagement points include a circular configuration. In one embodiment, the plurality of female engagement points and the plurality of male engagement points include a square configuration.

In one embodiment, the low gear is between about 1.6:1 and about 4.8:1 and the high gear is between about 22:1 to about 66:1. In one embodiment, the actuator is operably coupled to the machine controller. In one embodiment, the higher gear operates in an isokinetic mode and the lower gear operates in an isotonic mode or a calibration mode. In one embodiment, the motor system further comprises a neutral gear between the higher gear and the lower gear.

In operation, the actuator is activated to move from the first actuator position to the second actuator position or move from the second actuator position to the first actuator position. If the actuator reports that the actuator did not travel to the first actuator position from the second actuator position, then the controller operates a geared system module 350. The actuator is operably coupled to the machine controller. The higher gear operates in an isokinetic mode and the lower gear operates in an isotonic mode or a calibration mode. The motor system further comprises a neutral gear between the higher gear and the lower gear.

Figure 5:
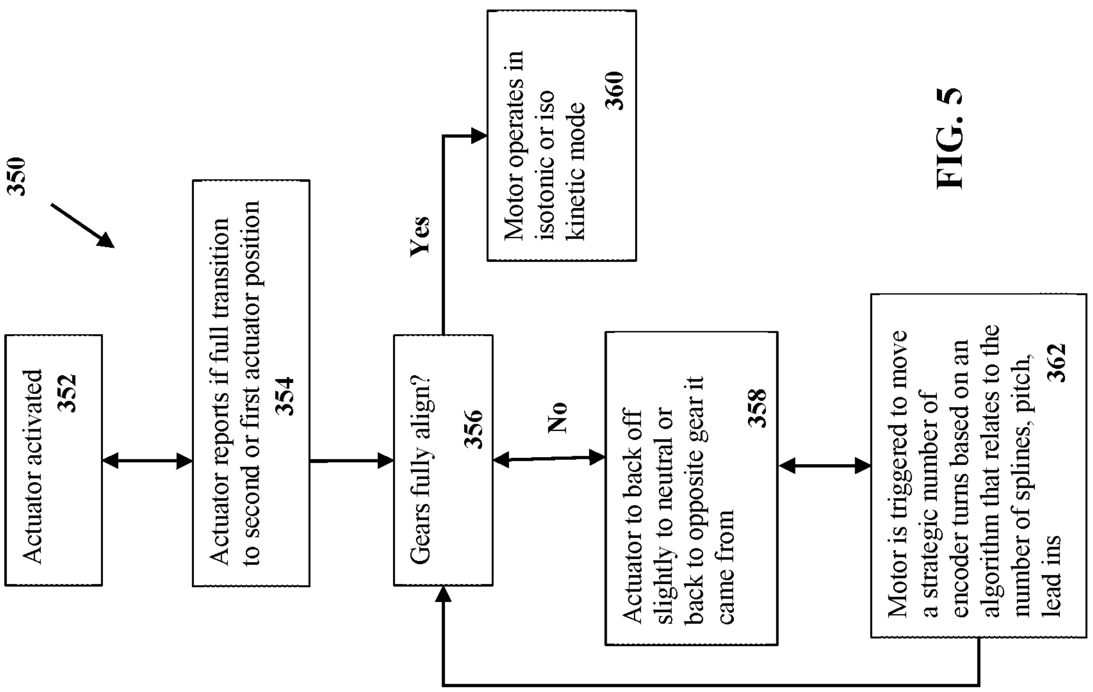
FIG. 5 is a flowchart outlining a geared system module, according to one embodiment.

As shown in FIG. 5, the geared system module 350 includes a step 352 where the actuator is activated. The actuator reports in step 354 if the actuator did not make a full engagement with the higher gear to the second actuator position or a full engagement with the lower gear in the first actuator position. Step 356 determines if the gears mechanically align and the plurality of female engagement points are locked into the plurality of male engagement points of the actuator. If the gears mechanically aligned, then the motor operates in the isotonic or isokinetic mode for the exercise machine in step 360. If the gears did not mechanically align, then step 358 triggers the actuator to back off slightly to neutral or back to opposite gear it came from. Then, the motor is triggered to move a strategic number of encoder turns based on an algorithm that relates to the number of splines, pitch, lead ins, etc. in Step 362. Once aligned using the algorithm the actuator is activated again and the male and female splines mesh.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

I claim:

1. A motor gear system for a resistance training machine, comprising:

an actuator operably coupled to the motor gear system, wherein the motor gear system is operatable to provide resistance in the resistance training machine;

the actuator shifts the motor gear system from a lower gear to a higher gear in a first actuator position, and the actuator shifts the motor gear system from the higher gear to the lower gear in a second actuator position; wherein the higher gear includes a plurality of female engagement points for the actuator, and the actuator includes a plurality of male engagement points for the higher gear, such that the plurality of male engagement points lock into the plurality of female engagement points as to lock the actuator in the first actuator position and the higher gear, and preventing a failed shift of the actuator from the lower gear to the higher gear if the plurality of male engagement points do not lock into the plurality of female engagement points, then the actuator rotates at least one degree as to lock the plurality of male engagement points into the plurality of female engagement points; wherein the plurality of female engagement points and the plurality of male engagement points are between about 3 and 42; and wherein the plurality of female engagement points and the plurality of male engagement points include a square configuration.

2. The motor gear system of claim 1, wherein the low gear is between 1.6:1 and 4.8:1 and the high gear is between 22:1 to 66:1.

3. The motor gear system of claim 2, wherein the actuator is operably coupled to the machine controller.

4. The motor gear system of claim 3, wherein the higher gear operates in an isokinetic mode and the lower gear operates in an isotonic mode or a calibration mode.

5. The motor gear system of claim 4, wherein the motor gear system further comprises a neutral gear between the higher gear and the lower gear.

6. A motor gear system for a resistance training machine, comprising:

an actuator operably coupled to the motor gear system, wherein the motor gear system is operatable to provide resistance in the resistance training machine;

the actuator shifts the motor gear system from a lower gear to a higher gear in a first actuator position, and the actuator shifts the motor gear system from the higher gear to the lower gear in a second actuator position;

wherein the higher gear includes a plurality of female engagement points for the actuator, and the actuator includes a plurality of male engagement points for the higher gear, such that the plurality of male engagement points lock into the plurality of female engagement points as to lock the actuator in the first actuator position and the higher gear, and preventing a failed shift of the actuator from the lower gear to the higher gear if the plurality of male engagement points do not lock into the plurality of female engagement points, then the actuator rotates at least one degree as to lock the plurality of male engagement points into the plurality of female engagement points; wherein the plurality of female engagement points and the plurality of male engagement points are between about 3 and 42; and wherein the plurality of female engagement points and the plurality of male engagement points include a triangular configuration.

7. The motor gear system of claim 1, wherein the low gear is between 1.6:1 and 4.8:1 and the high gear is between 22:1 to 66:1.

8. The motor gear system of claim 7, wherein the actuator is operably coupled to the machine controller.

9. The motor gear system of claim 8, wherein the higher gear operates in an isokinetic mode and the lower gear operates in an isotonic mode or a calibration mode.

10. The motor gear system of claim 9, wherein the motor gear system further comprises a neutral gear between the higher gear and the lower gear.

11. The motor gear system of claim 1, wherein the plurality of female engagement points and the plurality of male engagement points include a circular triangular configuration.

* * * * *